United States Patent
Williams et al.

(10) Patent No.: US 8,418,132 B2
(45) Date of Patent: Apr. 9, 2013

(54) APPLICATION DESCRIPTION LANGUAGE

(75) Inventors: Antony S. Williams, Mercer Island, WA (US); Stephen M. Danton, Seattle, WA (US); Arye Gittelman, Mercer Island, WA (US); Christopher D. Hackmann, Redmond, WA (US); Sam Spencer, Redmond, WA (US); Siddharth Jayadevan, Seattle, WA (US); Vladimir H. Hristov, Redmond, WA (US); William E. Aitken, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 11/360,856

(22) Filed: Feb. 23, 2006

(65) Prior Publication Data

US 2006/0248112 A1  Nov. 2, 2006

Related U.S. Application Data

(60) Provisional application No. 60/676,137, filed on Apr. 29, 2005, provisional application No. 60/703,220, filed on Jul. 28, 2005.

(51) Int. Cl.
*G06F 9/44* (2006.01)

(52) U.S. Cl. ........ 717/111; 717/105; 717/113; 717/125; 719/313; 719/315

(58) Field of Classification Search .......... 717/105, 717/110–113, 125; 719/313, 315, 332
See application file for complete search history.

(56) References Cited

U.S. PATENT DOCUMENTS

| 4,943,932 | A | 7/1990 | Lark et al. |
| 5,018,097 | A | 5/1991 | Kuhlmann et al. |
| 5,392,430 | A | 2/1995 | Chen et al. |
| 5,446,895 | A | 8/1995 | White et al. |
| 5,491,813 | A | 2/1996 | Bondy et al. |

(Continued)

FOREIGN PATENT DOCUMENTS

| JP | 06-332711 | 12/1994 |
| JP | 09-062733 | 3/1997 |

(Continued)

OTHER PUBLICATIONS

Chamberlin et al., "Quilt: An XML Query Language for Heterogeneous Data Sources", 2001, Springer Verlag Berlin Heidelberg, pp. 1-25.*

(Continued)

*Primary Examiner* — Don Wong
*Assistant Examiner* — Marina Lee
(74) *Attorney, Agent, or Firm* — Merchant & Gould

(57) ABSTRACT

A method and system for creating and modifying computer applications using an application description language based on a markup language is provided. An engine creates, connects, and initializes objects corresponding to entities, and specified by entity tags. A factory may be specified by an entity tag and used to create a plurality of entities. Applications are specified in a plaintext descriptive language using a markup language such as XML, enabling applications to be easily developed using object oriented techniques and abstraction. Altering preexisting applications is also simplified. Finally, an application may be dynamically reconfigured when the application's data changes. Type checking and conditional creation of entities is supported.

13 Claims, 7 Drawing Sheets

U.S. PATENT DOCUMENTS

| | | | |
|---|---|---|---|
| 5,519,866 A | 5/1996 | Lawrence et al. | |
| 5,659,701 A | 8/1997 | Amit et al. | 719/317 |
| 5,790,855 A | 8/1998 | Faustini | |
| 5,842,020 A | 11/1998 | Faustini | |
| 5,940,828 A | 8/1999 | Anaya et al. | |
| 5,951,653 A | 9/1999 | Hill et al. | |
| 5,980,096 A | 11/1999 | Thalhammer-Reyero | |
| 6,035,321 A | 3/2000 | Mays | |
| 6,083,276 A * | 7/2000 | Davidson et al. | 717/107 |
| 6,205,465 B1 | 3/2001 | Schoening et al. | 718/102 |
| 6,208,336 B1 | 3/2001 | Carter | |
| 6,256,780 B1 | 7/2001 | Williams et al. | 717/5 |
| 6,272,675 B1 | 8/2001 | Schrab et al. | |
| 6,339,775 B1 * | 1/2002 | Zamanian et al. | 707/101 |
| 6,415,434 B1 | 7/2002 | Kind | |
| 6,601,233 B1 | 7/2003 | Underwood | |
| 6,601,234 B1 | 7/2003 | Bowman-Amuah | |
| 6,621,295 B1 | 9/2003 | James-Roxby et al. | |
| 6,670,969 B1 | 12/2003 | Halstead et al. | 715/762 |
| 6,721,941 B1 | 4/2004 | Morshed et al. | |
| 6,721,951 B1 | 4/2004 | Williams et al. | 719/329 |
| 6,760,903 B1 | 7/2004 | Morshed et al. | |
| 6,820,135 B1 | 11/2004 | Dingman et al. | |
| 6,823,518 B1 | 11/2004 | Bliss et al. | |
| 6,983,464 B1 | 1/2006 | Bhattacharya et al. | |
| 7,031,968 B2 | 4/2006 | Kremer et al. | |
| 7,032,210 B2 | 4/2006 | Alloing et al. | 717/106 |
| 7,043,481 B2 * | 5/2006 | Mullins et al. | 707/10 |
| 7,103,873 B2 | 9/2006 | Tanner et al. | |
| 7,131,107 B2 | 10/2006 | Wall et al. | |
| 7,206,827 B2 * | 4/2007 | Viswanath et al. | 709/220 |
| 7,233,982 B2 | 6/2007 | Shenefiel | |
| 7,240,327 B2 | 7/2007 | Singh et al. | |
| 7,269,650 B2 | 9/2007 | Hamdan | |
| 7,280,996 B2 | 10/2007 | Hayakawa et al. | |
| 7,287,112 B1 | 10/2007 | Pleis et al. | |
| 7,287,259 B2 * | 10/2007 | Grier et al. | 719/331 |
| 7,383,285 B1 | 6/2008 | Pal et al. | |
| 7,412,497 B2 | 8/2008 | Viswanath et al. | |
| 7,506,307 B2 | 3/2009 | McCollum et al. | |
| 7,570,267 B2 | 8/2009 | Patel et al. | |
| 7,574,690 B2 | 8/2009 | Shah et al. | |
| 7,581,225 B2 | 8/2009 | Ahmad et al. | |
| 7,631,295 B2 | 12/2009 | Makowski et al. | |
| 7,886,269 B2 | 2/2011 | Williams et al. | |
| 8,046,737 B2 | 10/2011 | Wittenberg et al. | |
| 8,132,148 B2 | 3/2012 | Williams et al. | |
| 8,201,147 B2 * | 6/2012 | Williams et al. | 717/121 |
| 8,275,793 B2 | 9/2012 | Ahmad et al. | |
| 2002/0065950 A1 | 5/2002 | Katz et al. | |
| 2002/0069401 A1 * | 6/2002 | Wall et al. | 717/109 |
| 2002/0095650 A1 | 7/2002 | Green et al. | |
| 2002/0104068 A1 | 8/2002 | Barrett et al. | |
| 2002/0188761 A1 | 12/2002 | Chikirivao et al. | |
| 2003/0034998 A1 | 2/2003 | Kodosky et al. | |
| 2003/0056200 A1 | 3/2003 | Li et al. | |
| 2003/0063120 A1 | 4/2003 | Wong et al. | |
| 2003/0135825 A1 * | 7/2003 | Gertner et al. | 715/513 |
| 2003/0192031 A1 | 10/2003 | Srinivasan et al. | 717/120 |
| 2003/0204503 A1 * | 10/2003 | Hammer et al. | 707/6 |
| 2003/0236925 A1 | 12/2003 | Balek et al. | |
| 2004/0031018 A1 | 2/2004 | Marty | 717/120 |
| 2004/0051739 A1 | 3/2004 | Schmickley et al. | |
| 2004/0083238 A1 | 4/2004 | Louis et al. | |
| 2004/0083455 A1 | 4/2004 | Gschwind et al. | 717/120 |
| 2004/0088685 A1 | 5/2004 | Poznanovic et al. | |
| 2004/0162985 A1 | 8/2004 | Freeman et al. | |
| 2004/0163046 A1 | 8/2004 | Chu et al. | |
| 2004/0181779 A1 | 9/2004 | Gorti | 717/120 |
| 2004/0187090 A1 * | 9/2004 | Meacham | 717/103 |
| 2004/0230666 A1 | 11/2004 | Taboada et al. | |
| 2004/0230945 A1 | 11/2004 | Bryant et al. | |
| 2004/0250238 A1 * | 12/2004 | Singh et al. | 717/108 |
| 2005/0039162 A1 | 2/2005 | Cifra | |
| 2005/0044235 A1 | 2/2005 | Balahura et al. | |
| 2005/0050515 A1 | 3/2005 | Shah et al. | |
| 2005/0102615 A1 | 5/2005 | Roman et al. | |
| 2005/0120275 A1 | 6/2005 | Fletcher et al. | |
| 2005/0135383 A1 | 6/2005 | Shenefiel | |
| 2006/0059461 A1 * | 3/2006 | Baker et al. | 717/113 |
| 2006/0156294 A1 | 7/2006 | Fuller et al. | |
| 2006/0168183 A1 | 7/2006 | Fuller et al. | |
| 2006/0190105 A1 | 8/2006 | Hsu et al. | |
| 2006/0225034 A1 | 10/2006 | Peck et al. | |
| 2006/0245096 A1 | 11/2006 | Ahmad et al. | |
| 2006/0247936 A1 | 11/2006 | Khusial et al. | |
| 2006/0248104 A1 | 11/2006 | Ahmad et al. | |
| 2006/0248112 A1 * | 11/2006 | Williams et al. | 707/102 |
| 2006/0248448 A1 | 11/2006 | Williams et al. | |
| 2006/0248449 A1 | 11/2006 | Williams | |
| 2006/0248450 A1 | 11/2006 | Wittenberg et al. | |
| 2006/0248451 A1 | 11/2006 | Szyperski et al. | |
| 2006/0248467 A1 | 11/2006 | Elvanoglu et al. | |
| 2006/0248530 A1 | 11/2006 | Ahmad et al. | |
| 2006/0253830 A1 | 11/2006 | Rajanala et al. | |
| 2006/0277201 A1 | 12/2006 | Dorsett | |
| 2007/0150859 A1 | 6/2007 | Kodosky et al. | |
| 2007/0247525 A1 | 10/2007 | Samarasekera et al. | |
| 2008/0046885 A1 | 2/2008 | Shultz et al. | |
| 2008/0263549 A1 | 10/2008 | Walker | |
| 2010/0306735 A1 | 12/2010 | Hoff et al. | |
| 2012/0167039 A1 | 6/2012 | Williams et al. | |

FOREIGN PATENT DOCUMENTS

| | | |
|---|---|---|
| JP | 2001-318796 | 11/2001 |
| JP | 2004-227359 | 8/2004 |
| JP | 2006-258809 | 9/2004 |
| JP | 2004-280821 | 10/2004 |
| JP | 2004-334896 | 11/2004 |
| JP | 2004-350291 | 12/2004 |
| JP | 2005-043962 | 2/2005 |

OTHER PUBLICATIONS

Mascolo et al. "An XML based Programmable Network Platform" ICSE Workshop on Software, 2001—Citeseer, total pp. 5.*

U.S. Office Action dated Sep. 20, 2007 cited in U.S. Appl. No. 11/360,454.

International Search Report dated Apr. 26, 2007 cited in International Application No. PCT/US 06/15184.

U.S. Office Action dated Feb. 4, 2008 cited in U.S. Appl. No. 11/360,456.

U.S. Office Action dated Mar. 27, 2008 cited in U.S. Appl. No. 11/360,454.

U.S. Final Office Action dated Nov. 7, 2008 cited in U.S. Appl. No. 11/360,456.

U.S. Office Action dated May 22, 2009 cited in U.S. Appl. No. 11/360,456.

U.S. Final Office Action dated Jan. 6, 2010 cited in U.S. Appl. No. 11/360,456.

U.S. Office Action dated Mar. 8, 2010 cited in U.S. Appl. No. 11/360,457.

U.S. Office Action dated Mar. 9, 2010 cited in U.S. Appl. No. 11/360,448.

U.S. Office Action dated Mar. 16, 2010 cited in U.S. Appl. No. 11/360,851.

U.S. Office Action dated Mar. 24, 2010 cited in U.S. Appl. No. 11/360,857.

U.S. Office Action dated Mar. 30, 2010 cited in U.S. Appl. No. 11/360,455.

Chinese First Office Action dated Oct. 10, 2008 cited in Application No. 200680014637.X.

Chinese First Office Action dated Aug. 21, 2009 cited in Application No. 200680014618.7.

Russian Official Action dated Jan. 15, 2010 cited in Application No. 2007139779/09(043557).

Chinese Second Office Action dated Apr. 13, 2010 cited in Application No. 200680014637.X.

Chinese Office Action dated May 6, 2010 cited in Application No. 200680014594.5.

Russian Office Action dated Jun. 29, 2010 cited in Application No. 2007139779.

U.S. Final Office Action dated Aug. 16, 2010 cited in U.S. Appl. No. 11/360,851.

U.S. Final Office Action dated Aug. 20, 2010 cited in U.S. Appl. No. 11/360,857.
U.S. Final Office Action dated Aug. 23, 2010 cited in U.S. Appl. No. 11/360,455.
U.S. Final Office Action dated Aug. 30, 2010 cited in U.S. Appl. No. 11/360,457.
Chinese Second Office Action dated Nov. 17, 2010 cited in Application No. 200680014594.5.
European Supplemental Search Report dated Aug. 2, 2011 cited in Application No. 06758480.5.
European Supplemental Search Report dated Aug. 2, 2011 cited in Application No. 06751026.3.
Chinese Third Office Action dated Aug. 8, 2011 cited in Application No. 200680014594.5.
Roel Wuyts et al., "Applying Experiences with Declarative Codifications of Software Architectures on COD," 2001, 11 pgs., <URL:http://docs.google.com/viewer?a=v&q=cache: gTwc64myJS4J:citeseerx.ist.psu.edu/viewdoc/ download%3Fdoi%3D10.1.1.23. 4788%26repDrepl%26type%3Dpdf+instantiate+UI+>.
Bernhard Schätz, "Formalization and Rule-Based Transformation of MEF Ecore-Based Models," retrieved on Jun. 2, 2011, 19 pgs., <URL:http://www.fortiss.org/fileadmin/user_upload/FB1/Schaetz/SLE08-RuleBased.pdf>.
Chinese Second Office Action dated Jun. 9, 2011 cited in Application No. 200680014092.2.
European Supplemental Search Report dated Jul. 6, 2011 cited in Application No. 06769872.0.
European Supplemental Search Report dated Jul. 21, 2011 cited in Application No. 06758479.7.
U.S. Office Action dated Oct. 18, 2011 cited in U.S. Appl. No. 11/360,456.
Georg Sonneck et al., "Optimized One-to-One Personalization of Web Applications using a Graph Based Model," Source: IEEE, dated: Apr. 22, 2003, 8 pgs.
Chinese First Office Action dated Sep. 14, 2010 cited in Appl. No. 200680014092.2.
U.S. Office Action dated Nov. 9, 2010 cited in U.S. Appl. No. 11/360,456.
Russian Official Action dated Nov. 12, 2010 cited in Application No. 2007139779/08(043557).
Osamah A. Rawashdeh et al., "A Technique for Specifying Dynamically Reconfigurable Embedded Systems," source: IEEE, Mar. 5, 2005, pp. 1-11.
U.S. Final Office Action dated Apr. 26, 2011 cited in U.S. Appl. No. 11/360,456.
Copending U.S. Appl. No. 13/410,383, filed Mar. 2, 2012 entitled "XML Application Framework".
Japanese Notice of Rejection dated Feb. 7, 2012 cited in Application No. 2008-508960, 6 pgs.
Zoltán Benedek, "A Framework Built in .NET for Embedded and Mobile Navigation Systems", .NET Technologies 2004 workshop proceedings, http://dotnet.zcu.cz/NET_2004/Papers/C05.pdf, 8 pgs.
Japanese Notice of Final Rejection dated Mar. 16, 2012 cited in Application No. 2008-508957, 9 pgs.
Japanese Notice of Final Rejection dated Apr. 20, 2012 cited in Application No. 2008-508958, 4 pgs.
Chinese Fourth Office Action dated Apr. 24, 2012 cited in Application No. 200680014594.5, 7 pgs.
Japanese Notice of Rejection dated Nov. 25, 2011 cited in Application No. 2008-508957, 13 pgs.
Shingo Nakagawa et al., "A Development System for Resource-Oriented Applications," Computer Software, vol. 20, No. 5, pp. 20-31, Japan Society for Software Science and Technology, Japan, Sep. 25, 2003 (partial translation as discussed in JP Notice of Rejection).
Japanese Notice of Rejection dated Nov. 25, 2011 cited in Application No. 2008-508958, 9 pgs.
Japanese Notice of Rejection dated Dec. 6, 2011 cited in Application No. 2008-508959, 12 pgs.
U.S. Office Action dated Jul. 18, 2012 cited in U.S. Appl. No. 11/360,857, 24 pgs.
Chinese Decision on Rejection dated Jan. 6, 2012 cited in Application No. 200680014092.2, 10 pgs. .
U.S. Office Action dated Jan. 20, 2012 cited in U.S. Appl. No. 11/360,455, 32 pgs.
Japanese Final Notice of Rejection dated Aug. 3, 2012 cited in Application No. 2008-508960, 6 pgs.
U.S. Final Office Action dated Aug. 31, 2012 cited in U.S. Appl. No. 11/360,455, 29 pgs.

* cited by examiner

APPLICATION DESCRIPTION LANGUAGE

CROSS-REFERENCE TO RELATED APPLICATIONS

This patent application claims priority to U.S. Patent Application Ser. No. 60/676,137 filed Apr. 29, 2005 and entitled "Application Description Language," and U.S. Patent Application Ser. No. 60/703,220 filed Jul. 28, 2005 and entitled "Markup Language Based Application Framework with Application Description Language, Concurrency Domains, Application Framework Phasing Models, and Application Framework Transaction Transforms", the disclosures of which are expressly incorporated herein, in their entirety, by reference.

This patent application is also related to and filed concurrently with U.S. patent application Ser. No. 11/360,454, entitled "Multithreading with Concurrency Domains,"; U.S. patent application Ser. No. 11/360,455, entitled "Application Framework Phasing Model,"; U.S. patent application Ser. No. 11/360,457, entitled "XML Application Framework,"; and U.S. patent application Ser. No. 11/360,456, entitled "Transaction Transforms,"; U.S. patent application Ser. No. 11/360,857, entitled "XML Application Framework"; U.S. patent application Ser. No. 11/360,851, entitled "XML Application Framework"; U.S. patent application Ser. No. 11/360,448, entitled "XML Application Framework"; which are assigned to the same assignee as the present application and expressly incorporated herein, in their entirety, by reference.

COPYRIGHT NOTICE

A portion of the disclosure of this patent document contains material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

There are at least two types of high-level programming languages in use today. The primary types of languages may be classified as imperative or procedural languages and declarative programming languages. A procedural language is a programming language in which the basic programming element is a procedure (i.e., a named sequence of statements, such as a routine, subroutine, or function). Many high-level languages (e.g., Fortran, C or Pascal) are procedural languages. In these languages, the developer must provide a list of instructions to execute in a specified order. Although powerful, such languages have drawbacks in that developers must manage the flow of execution. Developers typically must write event-handlers and data structures to deal with application state, which may be quite difficult. Further, the developer typically has to manage the mapping between data structures and the visual elements representing the data structures. As a result, application developers must write a significant amount of underlying imperative code that is different from one application to another.

It is with respect to these considerations and others that the present invention has been made.

DETAILED DESCRIPTION

Aspects of certain embodiments of the present invention relate to a declarative or descriptive language for authoring data flows, bindings, and rules that characterize applications. Other aspects relate to a runtime engine, which, at runtime, processes or executes the declarative application, i.e., "application description" to create objects (via builders) which view and/or process data. Consequently, a developer need not write the actual code for the objects that do the data processing, but need only write the declarative application file that is ultimately compiled and executed. As will be discussed in detail below, such a system provides numerous benefits over prior art methods of programming applications.

The use of such a declarative language is different from the use of an imperative language as described in the Background by declaratively modeling an application's data, processing and conversion of the data, user interface (UI) and the way the UI interacts with the data. Embodiments of the present invention relate to a particular declarative language used to characterize XML Application Framework (XAF) applications. The declarative language is sometimes referred to herein as XAF Application Definition (XAD). Although much of the implementation details described herein refer to the use of XML, those skilled in the art will recognize that other syntaxes could be used to implement aspects of the present invention.

As may be appreciated, in order to provide such separation between the declarative application file and the configuration of instantiated objects that perform the data processing, in an embodiment, a platform may be used, such as a platform that builds and executes applications. In accordance with aspects of the present invention, the platform used is referred to herein as the XAF platform, which is a platform for building and executing such software applications. In particular, XAF also uses XML to uniformly represent data, and employs a highly componentized approach to building each application. In an embodiment, XAF leverages XML to provide powerful data transformation capabilities and rich data. Both external data and application state can be accessed and manipulated using XML's capabilities. User interfaces and complex data flows may be defined in XAD. More information regarding XAF is presented in the related application Ser. No. 11/360,457, having the title "XML Application Framework," filed concurrently with the present application, and assigned to the common assignee Microsoft Corporation, which application is incorporated by reference herein in its entirety.

Figure 1:
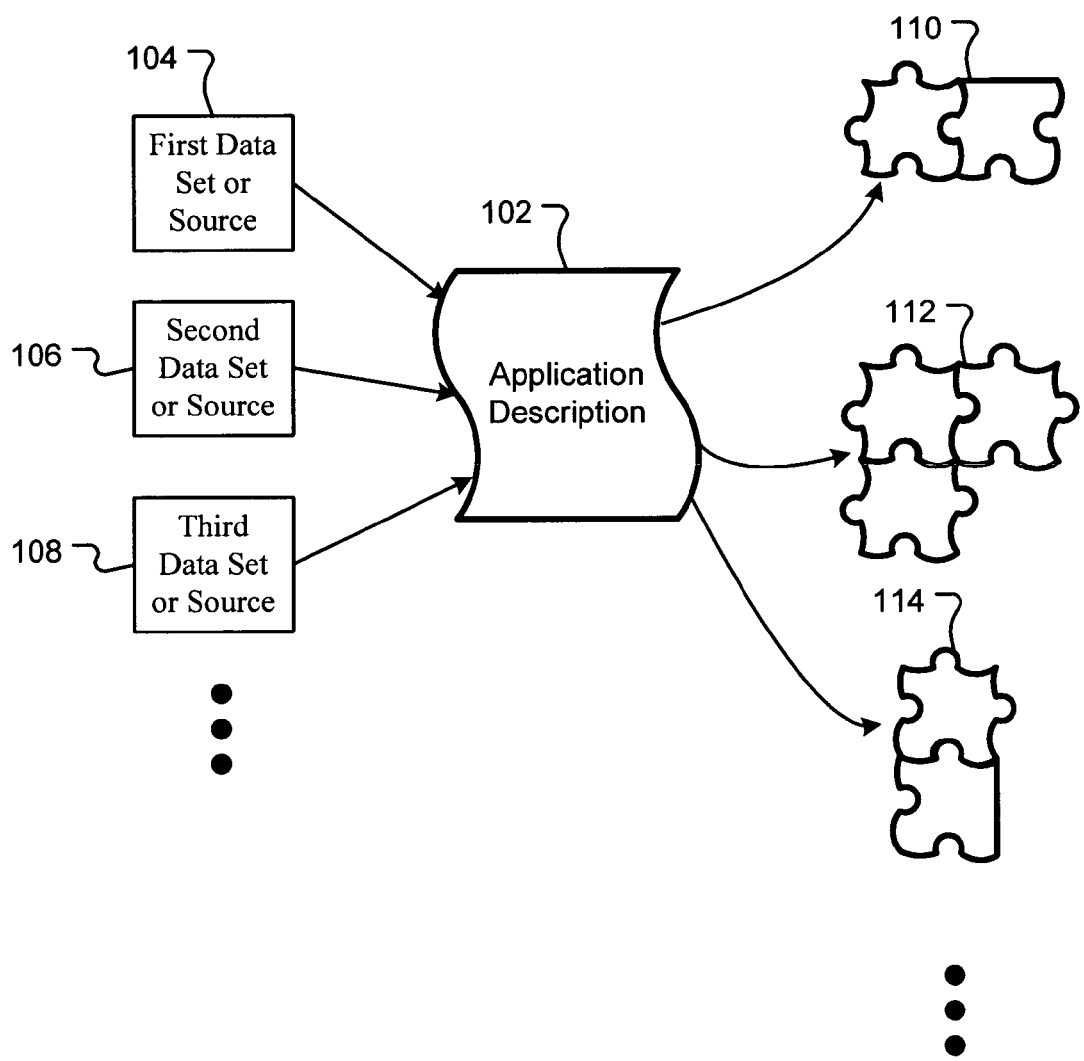
FIG. 1 is a high-level depiction of an application description in relationship with data and objects created to form an executable application.

As stated, XAD is a declarative language used to author XAF applications. FIG. 1 is a high-level depiction of an application description in relationship with data and objects created to form an executable application. XAD is used to create an application description 102 that declares or describes data, such as data sets or stores 104, 106 and 108, such that, at runtime, components 110, 112 and 114 are created to process, view and/or edit the data, essentially constructing a configuration of objects that make up an executing application.

In the exemplary embodiments herein, the application description 102 is expressed as a set of declarative constructs, such as well-formed XML. The application description 102, therefore describes how one or more objects 110, 112 and 114 should be configured within the executing application. In essence, the application description 102 is used to compute the configuration of the application but not the results of the application, which is done by objects 110, 112 and 114. Since the objects 110, 112 and 114 may be used by other applications written in non-declarative languages, XAD improves application development by reuse of such objects. Further, XAD enables the dynamic creation and modification of applications in ways not possible using traditional, static declarative application definitions as discussed in more detail below.

With respect to the data 104, 106 and 108 shown in FIG. 1, these sources may relate to text data stores, SQL data base stores, XML sources, Web Service sources, etc. Indeed, the application description 102 is considered to be centered around the data, such that it is data centric. Application state may be considered another source of "data" and treated in a similar manner as more conventional data on which the configuration of objects 110, 112 and 114 is operating. The developer is thus primarily concerned with specifying the way that data flows through the application, and the rules that govern how the application responds to that data. XAD provides a simple and inexpensive way to build and alter applications, which enables the targeting of diverse software application niches and a low complexity bar for new developers. Applications built using the claimed invention have the ability not only to aggregate and transform data flowing into the application, but also to select one or more user interfaces most appropriate for the data type.

The objects 110, 112 and 114 represent well-factored components, such as viewers, editors, transformers, etc. The application description can call "pre-programmed" components and/or add new components to the set.

Objects have well-defined types, so the corresponding XAD tags and parameters have corresponding types in the XAD language. XAD is strongly typed and the XAD compiler detects errors statically. Tags and parameters have return types and cardinality constraints. Additionally, data-types support several additional constraints: schema, conversion requirements, and accessor availability (accessors are strongly typed object facades for XML data).

XAD not only allows existing applications to be modified or augmented simply by altering one or more text files, but also allows developers to constrain modifications and add-ins (modules that may be added to existing applications, roughly analogous to browser plug-ins) to preserve security, and user model integrity as discussed in more detail below.

Sample XAD Application

In order to understand many of the nuances of XAD and in particular an XAD application description, such as application description 102, a sample description will be discussed. Table 1 illustrates the source code of a sample XAD application in accordance with one embodiment of the invention. Sample XAD application in Table 1 is relatively simple and many other, complex XAD applications are contemplated. Indeed, the sample shown in Table 1 has a sole function to print out a "Hello World" message.

TABLE 1

Sample XAD Application Description

| 1 | <?xml version="1.0" encoding="UTF-8" ?> |
| 2 | <sys:Xad |
| 3 | xmlns:sys = "http://schemas.microsoft.com/2005/xad/system" |
| 4 | xmlns = http://schemas.microsoft.com/2005/xad/ |
| 5 | framework> |
| 6 |   <sys:TagDefinition Name="sys:Main" Type="fwk:Application"> |
| 7 |     <sys:Body> |
| 8 |       <Application> |
| 9 |         <Window> |
| 10 |           <TextBlock Text="Hello World" |
| 11 | FontSize="25"/> |
| 12 |         </Window> |
| 13 |       </Application> |
| 14 |     </sys:Body> |
| 15 |   </sys:TagDefinition> |
| | </sys:Xad> |

As may be appreciated, the sample shown in Table 1 comprises several XML tags in order to describe the resulting objects that process data. Line 1 identifies the version of XML and Line 2 identifies the system tag for XAD application description, which is described in more detail below. Lines 3-4 identify some namespaces of tags available in XAF. The primary portion of the sample in Table 1 for the purpose of this discussion is the "Application" tag shown in Line 8. The application tag is an example of an entity tag that causes the creation of an application object at runtime that orchestrates the application, and controls the highest levels of application functionality. Similarly, the "Window" tag in line 9 (another example of an entity tag) causes the creation of a window object, i.e., a user interface entity that is responsible for the display of an application's frame. In this case "Window" is a parameter of "Application." Finally, a "TextBlock" entity, the resulting text object created as a result of the text tag in line 10, is a user interface entity created at runtime that is responsible for the display of text (in this case, "Hello World"). The use of tags to create objects (via builders) is described in much more detail below. The foregoing example is provided simply to show a more simple sample XAD application.

Figure 2:
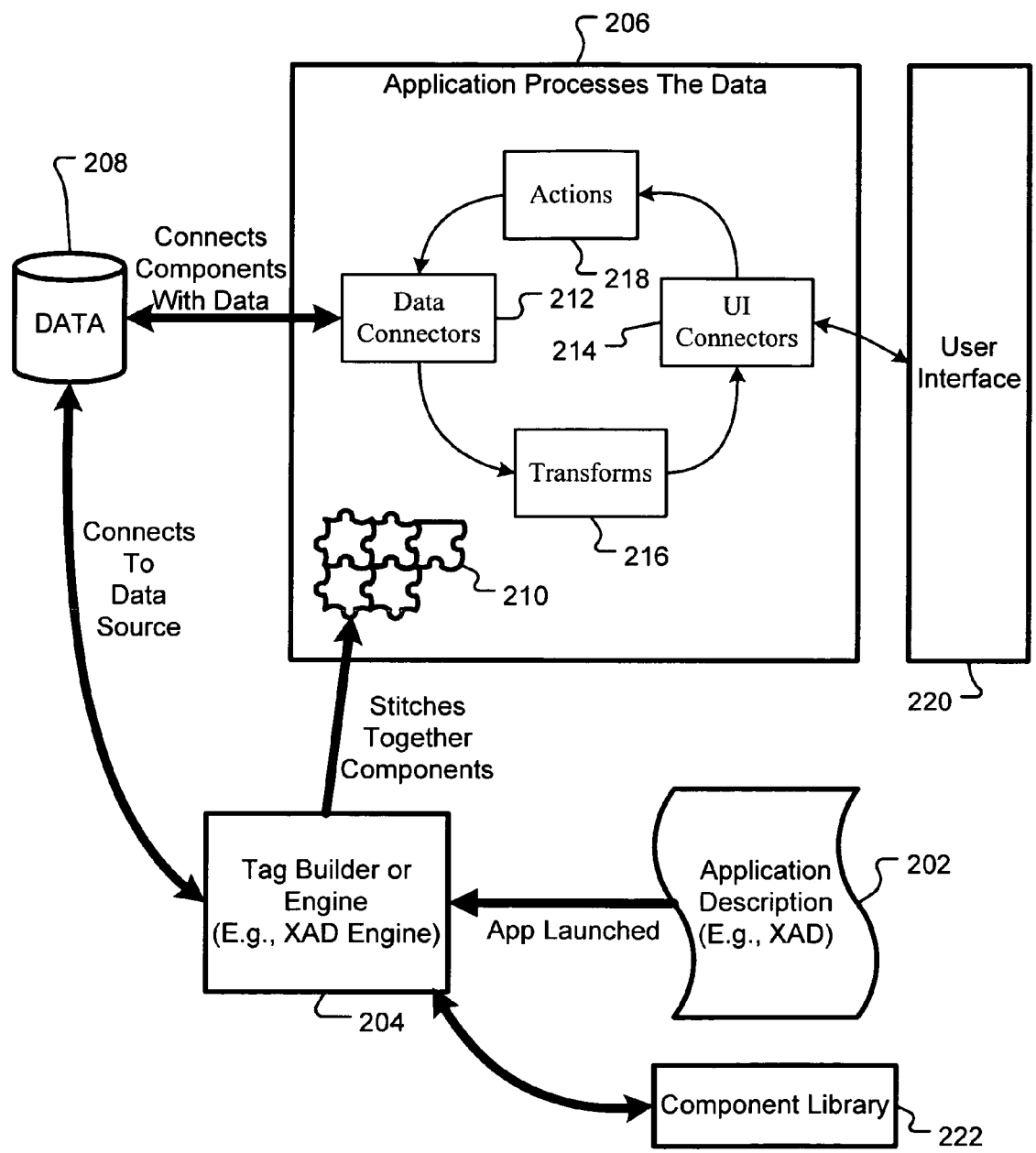
FIG. 2 illustrates the application description shown in FIG. 1 as it is executed to process the data in accordance with a particular embodiment of the present invention.

In operation, the XAD application shown in Table 1 is compiled and executed to create the application, window and text objects, as generally shown in FIG. 2. That is, FIG. 2 illustrates an application description 202, which is similar to description 102 shown in FIG. 1 and/or the XAD application shown in Table 1 as it is executed to process the data in accordance with a particular embodiment of the present invention.

Initially, a developer authors the application description 202. In an embodiment, the first tag of the XAD file 202 is "<sys:XAD>". Also, in order to operate correctly, the computer system can have access to XAF or any suitable equivalent, such as by installing the XAF SDK for example. Upon issuing an app launch command, the XAD 202 is automatically verified and, in one embodiment, compiled to a more efficient form. A compiler or XAF engine 204 parses the XAD 202 and executes the compiled form which instantiates the necessary objects. Also, the engine 204 stitches the object components (also referred to as entities) together to create the application 206 that ultimately processes the data. Meanwhile the engine 204 connects, i.e., binds, the various objects with the necessary data 208. Engine 204 may also be considered a configuration service in that it instatiates the objects and connects the objects together to create the application 206.

The application 206 is represented as combined portions 210, wherein the combined portions are also shown as items 212, 214, 216 and 218. For instance, the application 206 may have one or more data connector entities 212. The data connector entities 212 represent the objects that connect data to the system and communicate with the various data stores available. Another type of entity relates to the UI connectors 214. The UI connectors 214 represent the objects that actually process user interface features, and in fact, communicate with the user interface 220. Also included in the application 206 are transforms 216 that typically provide some transformation of data prior to relaying information to the UI connectors, and actions 218 that process data to perform some type of action such as modifying data. More details of the process that creates the necessary components and the process of binding objects to the data are described below.

As may be appreciated from this discussion, the tags used in the XAD 202 are not used to refer to specific objects, but instead, XAD tags refer to object factories. An object factory is a description that XAD uses in conjunction with its tag builder class to build one or more entities using parameters specified in the tag. The engine 204 provides the actual creation of such objects. In an embodiment, the engine has access to a component library 222 that provides some details of existing and/or reusable tags and objects.

Figure 3:
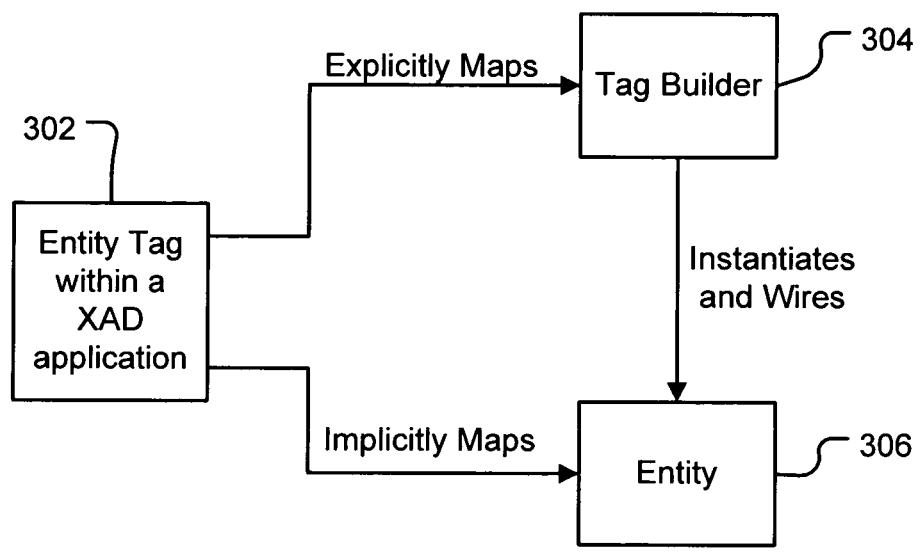
FIG. 3 illustrates the interrelationship between the internal components of the application description of FIGS. 2 and 3 and resulting objects used to process and/or view data.

Consequently, applications 202 are defined using tags, allowing modular construction of applications. FIG. 3 illustrates the structural interrelationship between components in accordance with this concept. An entity tag 302 (such as entity tags shown in lines 8, 9 and 10 of Table 1) is associated with an entity 306. A builder 304 reads an entity tag 302, and maps it. Builder 304 instantiates and connects one or more objects (not pictured) associated with an entity tag connects the entity tag 302 with the entity 306. To the developer, it appears that an entity tag 302 is implicitly mapped to its associated entity 306, since the mapping, instantiation, wiring or connecting, and initialization can take place behind the scenes.

With these general principles in mind, some of the specifics of XAD will be discussed. For more details of the language, a specification is attached as Appendix A which is expressly incorporated into this specification.

Objects and Factories

Objects are instantiated through factories which may be builder components, or the XAD engine customized with fragments of XAD. Factories permit deferred instantiation for purposes such as lazy evaluation or virtualization (saving the cost of objects that need not be instantiated immediately). This is achieved through parameters that have the NewScope="True" attribute. Together with conditional instantiation through the sys:Switch construct, factories enable dynamic data-dependent application configuration. Use of dependency management and revalidation in the XAF platform enables the XAD engine to automatically reconfigure the application as needed when data changes. This eliminates the need for imperative reconfiguration code which is common in conventionally written applications, and which is costly and error-prone. The XAD engine enables factories to be defined in the XAD language, and constructs the corresponding factory implementation automatically.

A variety of object types may be instantiated using framework tags in XAD, such as objects 110, 112 and 114 shown in FIG. 1. One such object relates to a "data provider" object, also referred to as a data connector, wherein data provider objects represent sources and manipulations of data that an application may use. Data provider objects connect to data sources (by which an application may receive external data) and data transformations (logical or arithmetic operations performed on incoming data).

Another type of object that may be instantiated using a framework tag in XAD is a user interface object. User interface objects provide functionality relating to control display, and to input handling. A user interface object can be used to trigger an action (see actions, discussed below).

Yet another type of object that may be instantiated using a framework tag in XAD is an action. Actions provide "hooks" (functions attached to a user interface element) to handle for user events. For example, clicking on a button on the user interface will activate an action object associated with the button.

When user event occurs, the corresponding action can be used to store and pass event details. Event details may be stored in main memory, on a hard drive, or other memory media. Event details are passed using "scope" variables, which are discussed below. For example, if the user event was a mouse click, it may make sense to store the x and y positions of the mouse at the time of the event. Other details that may be stored when a user event occurs include, but are not limited to, which key was pressed, which index of a list of data elements was selected at the time of the event, which row and/or column of a table were selected at the time of the event, which rows and/or columns of a table were visible to the user at the time of the event, etc. Through the use of these events, application functionality is realized.

Entity Tags

As may be appreciated from the example shown in Table 1 above, XAD applications comprise the use of tags. In an embodiment, the one kind of tag is the "entity tag." Other tags, such as grouping or selector tags are discussed in more detail below. Entity tags map to common language runtime (CLR) objects at runtime. The only restriction on the CLR object is that it must (in an embodiment) be a XAF entity. To be a XAF entity, a CLR object derives from one of two base classes, e.g., "Microsoft.Xaf.Core.BaseTypes.EntityElement" or "Microsoft.Xaf.Core.BaseTypes.EntityComposite", and adhere to certain protocols and contracts defined by XAF.

The builder 304 (FIG. 3), is responsible for the actual instantiation of the entity, and is sometimes referred to as a "tag builder" or "entity builder." In an embodiment, entity builders are user-defined .NET classes for creating entities and/or connecting entities to each other according to. Entity builders are used to implement primitive XAD tags. Additionally, entity builders are the point of interaction between the engine 204 and custom extensions of the language such that the XAD language, in an embodiment, specifically defines the requirements for writing entity builders. More details of the tag or entity builder are provided in Section 3.5 of the attached Appendix A which is expressly incorporated into this specification.

Exemplary entity tags are shown in Table 1 above, in lines 8, 9 and 10. For instance, in line 8, an application entity tag is shown. As stated above, this tag causes the instantiation of an entity that orchestrates the application, and controls the highest levels of application functionality. A window entity tag (line 9 of Table 1) causes the creation of a user interface entity that is responsible for the display of an application's frame. Finally, a text entity tag (line 10 of Table 1) causes the creation of a user interface entity responsible for the display of text (in this case, "Hello World"). As may be appreciated by those skilled in the art, many other entity types may be defined and used.

Before using an entity tag, such as the application entity tag, window entity tag or text entity tag shown in Table 1, each entity tag is defined, e.g., within the XAF platform. Indeed, every entity tag has a corresponding tag definition. Every tag definition contains enough information to eventually map every entity tag to an entity. Entity tags are defined by declarations of the form, for instance, the "Text" tag definition begins as follows "<sys:TagDefinition Name="Text" . . . > . . . " and ends with the following: "</sys:TagDefinition>".

Included in the definition is the "name" for the new tag, e.g., "Text" and the "type" for the particular entity tag. Entity tags may be classified into various types and all entity tags have a type. These types are an extensible set and really correspond to the CLR type of the entity associated with a tag. Some types used by the XAF framework include "sys:Data", "sys:EventHandler", "fwk:UIElement" and "sys:Selector". Whether the tag is added to the framework or the system typically depends on whether the tag draws on internal engine interfaces and/or versions at the same rate as the core language. If so, then the tag should be added to the system otherwise it is added to the framework. The type is declared in its definition. Continuing with the Text definition provided above, the tag definition can be expanded shown below in Table 2.

TABLE 2

Definition for Text Entity Tag including a Type

<sys:TagDefinition Name="Text" Type="fwk:UIElement" ...>
...
</sys:TagDefinition>

In Table 2, the tag definition indicates that a new entity tag named Text should be created of type fwk:UIElement (a framework tag indicating a UI Element type of entity). The Text tag may subsequently be used anywhere a fwk:UIElement entity may be invoked. An example of the Text entity tag can be seen in the HelloWorld.xad example appearing in Table 1.

Parameterization

Typically, each entity tag in a XAD application description has some parameters to describe how to create, connect, or configure the resulting object or entity. A parameter may be a reference to a piece of data, or a reference to a factory or object. For instance, a scope attribute may be associated with a parameter to indicate whether the parameter refers to a factory or an object. If a parameter requires a certain type of object to be applicable, the parameter may be marked with that type for type consistency checking. Such type checking ensures that execution of an application will not result in a type mismatch, which could cause an incorrect computation.

XAD allows many different ways of declaring the parameters for an entity. A common form is shown below in Table 3.

TABLE 3

Sample Tag Definition for a Text Entity with Parameters

<sys:Type Name="fwk:FontFamily" ManagedType="...FontFamily..." />
<sys:Type Name="fwk:FontFamilyData"
DataConstraint="xsd:string"
ConvertibleTo="fwk:FontFamily" ConverterClass="
...FontFamilyConverter..." />
<sys:TagDefinition Name="fwk:Text" Type="fwk:UIElement">
    <sys:Param Name="FontFamily" Type="fwk:FontFamilyData" ... />
    ...
</sys:TagDefinition>

Initially, "Param" is a reserved name within embodiments of XAD and is used to define parameters. Also, as indicated by the ellipses in Table 3, one or more other parameters may also be added to a Text tag definition. In this example, a new entity of type UI element named Text should be created. Further, a single parameter named "FontFamily" of type "Data" (and more specifically "String Data") should be created. The resulting Text tag can be used with a static content string, e.g., "<sys:Text FontFamily="Arial" ... />" which will cause the text to be in Arial font. Importantly, tag definition parameters correspond to an attribute within the actual instance of the tag that has the same name as the parameter.

Alternatively, a tag may be defined to take parameters that are other entities, e.g., "<Text FontSize="25"> <foo:RandomWordGenerator Param="Text"/> </Text>". In an embodiment, the above definition will cause the Text tag's Text attribute to use the value returned by the foo:RandomWordGenerator function object, and render the resulting value on the screen in a twenty five point font. In another embodiment, this definition could have been written as: "<Text FontSize="25"> <Text.Text> <foo:RandomWordGenerator/> </Text.Text> </Text>". The latter definition will instantiate a Text entity, and define its Text attribute as the value of foo:RandomWordGenerator.

In an embodiment, parameters themselves may contain a plurality of its own entities. Table 4 illustrates example code portions setting parameters.

TABLE 4

Example XAD Snippet Setting Parameters

1   <sys:TagDefinition Name="FlowPanel" Type="fwk:UIElement">
        sys:Param Name="Children" Type="fwk:UIElement"
        Max="Unbounded" />
    </sys:TagDefinition>
2   <FlowPanel FlowOrientation="Vertical">
        <FlowPanel.Children>
            <TextBlock Text="John Smith"/>
            <TextBlock Text="Jane Doe"/>
            <TextBlock Text="Amanda Jones"/>
        </FlowPanel.Children>
    </FlowPanel>

The code shown in Table 4 (Row 1) defines the UI Element named FlowPanel and has several parameters, thus causing the display of a flow of UI elements. The set of UI elements to be displayed can be specified via a single parameter named "Children" which are defined in Table 4 (Row 2). That is, Row 2 illustrates the application description calling/describing the flow panel defined in Row 1.

One default parameter may be specified for each entity in XAD. Table 5 illustrates an example line of code defining a default parameter, whose name is "Children". If no parameter name is specified on a child tag, the child will be associated with the parameter whose DefaultParam attribute is set to "true".

TABLE 5

Default Parameter Example

<sys:Param   Name="Children"   Type="fwk:UIElement"
Max="Unbounded"   Min="0"
DefaultParam="true" ... />

Data Binding

In an embodiment, XAD leverages data binding (the binding of XML data to an object designed especially for the data). The name of an object may therefore be used to reference data more specifically when specifying parameters. Unlike static values (which, by definition, remain constant for the lifetime of an application), a data bound value can be updated through modification of the data bound value's associated data. In one embodiment, this modification may be performed by an application. In another embodiment, this modification may be performed by a user or an external process. In an exemplary embodiment, the line "<Text Text="$TextValue" FontSize="25"/>" causes the Text parameter to be assigned a value of "$TextValue". In this embodiment, "$" is a reserved character and use of this character in this manner invokes data binding during the creation and connecting of the components. Such data binding causes the indirect pointing or associating of data from another source or object to be bound to this entity tag. For more details on the data binding capabilities of the XAF environment, see application titled "XML Application Framework," Ser. No. 11/360,457, incorporated by reference above.

Data binding may be used to refer to literal data. That is, literal data may be specified using the sys:InlineData tag. For example, "<sys:InlineData Name="TextValue">Hello World</sys:InlineData>" defines a piece of inline data, namely the string "Hello World." This exemplary literal data tag is given the name TextValue. Consequently, by using the name $TextValue in a XAD description, the XAD code can bind to the data within the literal data tag, and use it for the value of any parameter of type sys:Data.

Data binding may also be used to refer to a relative data location. For example,
<Text Text="$SomeLocation/myd:Employees/myd:Employee/myd:Name"/>
uses a dynamic prefix, i.e., "$SomeLocation" followed by relative data references, i.e., "myd:Employees", "myd:Employee", and "myd:Name" without using the "$" character. The result is a data binding to the absolute location formed from the value of $SomeLocation appended with the given relative location.

Additionally, data binding may be used in conjunction with grouping tags. For example, the sample code in Table 6 (Row 1) binds the MergeTreesTransform entity to the set of entities under the Resources grouping tag.

TABLE 6

Data Binding To Grouping Tags or Actions

1   <Resources Name="MyDataSources">
        <XmlFileDataSource ... />
        <SQLDataSource ... />
    </Resources>
    ...
    MergeTreesTransform Trees="$MyDataSources" />
2   <Text>
        <sys:InlineData Param="Text" Name="ScratchData"
        Writable="true">
            <Greeting>Bye</Greeting>
        </sys:InlineData>
        <SetTextValueAction Param="MouseLeftButtonDown"
            Data="$ScratchData" NewValue="Ciao" />
        <SetTextValueAction Param="MouseRightButtonDown"
            Data="$ScratchData" NewValue="Au Revoir" />
    </Text>

Table 6 (Row 2) illustrates that XAD allows binding actions to data values. For example, the following definition binds actions to the value of $ScratchData. Under the definition, the initial value of $ScratchData is "Bye." "MouseLeftButtonDown" is a parameter of type "sys:EventHandler." The action corresponding to the "MouseLeftButtonDown" parameter is invoked whenever the Text entity encounters a Left Mouse Button Down event. This event will cause the SetTextValueAction to be invoked, which will change the text value of the <Greeting> element to "Caio." Likewise, a Right Mouse Button Down event will result in the value of $ScratchData changing to "Au Revoir."

In yet another example, data binding allows an application to receive command line parameters. For example, the sample code in Table 7 allows specification of command line parameters. The sys:Main tag is the entry point for applications.

TABLE 7

Command Line Data Binding

1   <sys:TagDefinition Name="sys:Main" Type="Application">
        <sys:Param Name="TextData" Type="sys:Data" />
        <sys:Body>
            <Application>
                <Window>
                    <FlowPanel>
                        <Text Text="$TextData" />
                    </ FlowPanel>
                </ Window>
            </ Application>
        </ sys:Body>
    </ sys:TagDefinition>

The application defined in Table 7 accepts command line parameters such as "xad CommandLine.xad/TextData=Testing" where CommandLine.xad is the name of the application, TextData is the parameter name, and Testing is the value. In an embodiment, a plurality of parameters can be passed into XAD in the form of "xad ApplicationName/ParamName1=Value1/ParamName2=Value2 . . . /ParamNamen=Valuen". One skilled in the art will appreciate that while the exemplary embodiment above uses a string as an input value, command line parameters may alternatively or additionally include alphanumeric values, names of files, image or other resource locations, etc. Also, a command line parameter may be given a default value for use when no command line parameter value was specified for the parameter.

Data Source Tag

In an embodiment, external data is exposed to an XAD application by way of a DataSource tag. Further, the XmlFileDataSource tag may be used to establish a connection between an application and an XML file so that the latter may be used as a data source by the application. External data sources may be used in a fashion similar to inline data provided by sys:InlineData tags. External data sources, however, may be saved out to disk using XAD actions, and thus changes to data by other users can be consumed by the application if desired.

Derived Tag Definition

XAD allows the use of derived tag definitions to leverage abstraction and reuse of definitions. For example, in an application that requires a series of twelve point Verdana font headings, a user might place a definition such as "<Text FontFamily="Verdana" FontSize="12" Text="heading text here"/>" at each position where a heading is desired. However, if many hundreds or thousands of headings are needed, each one being potentially different, derived tag definitions allow for greater efficiency in specification. More specifically, a derived tag definition can be defined and an example is shown in Table 8.

TABLE 8

Derived Tag Definition Example

```
<sys:TagDefinition Name="TitleText" Type="fwk:UIElement">
    <sys:Param Name="Text" Type="sys:StringData" />
    <sys:Body>
        <Text Text="$Text" FontFamily="Verdana" FontSize="12" />
    </sys:Body>
</sys:TagDefinition>
```

The definition shown in Table 8 will cause XAD to create a new tag named TitleText of type fwk:UIElement. The Text parameter within the tag is bound to the value passed in for $Text, which can be passed in differently for each instantiation of the heading.

As another example, consider the following example shown in Table 9, wherein the first row is a sample snippet of XAD, the second row illustrates a sample derived tag definition to replace the snippet of XAD and the third row illustrates an instantiation call using the derived tag definition.

TABLE 9

Sample Snippet, Derived Tag Definition, Sample Instantiation

```
1   <StackPanel>
        <TextBlock FontWeight="Bold" Text="My Caption"/>
        <foo:Table FontFamily="Arial">
            <XmlFileDataSource Param="Table"
                File="MyTable.xml"/>
        </foo:Table>
    </StackPanel>
2   <sys:TagDefinition Name="foo:TableWithCaption"
        Type="fwk:UIElement">
        <sys:Param Name="Caption" Type="sys:StringData" />
        <sys:Param Name="TableFile" Type="sys:StringData" />
        <sys:Body>
            <StackPanel>
                <TextBlock FontWeight="Bold" Text="$Caption"/>
                <Table FontFamily="Arial">
                    <XmlFileDataSource       Param="Table"
    File="$TableFile"/>
                </Table>
            </StackPanel>
        </sys:Body>
    </sys:TagDefinition>
3   <foo:TableWithCaption Caption="Sales"
        TableFile="SalesTable.xml"/>
```

As is shown in Table 9, derived tags can increase the functionality and simplicity in calling or instantiating the same items multiple times.

Scope and New Scope Parameters

Scope parameters provide defined boundaries for certain sub-graphs of objects of varying lifetimes, in particular for delayed and/or repeated instantiation of those entities. Factories are the means of deferring and later invoking instantiation. Scope variables provide values that are parameters provided by the entity that invokes the instantiation. One example of use of scope variables is to allow for the receipt of different event properties, such as mouse button down events.

XAD uses new scope parameters to pass data between applications, between objects, and/or between combinations thereof. In an embodiment, new scope parameters may be used by a parent application to pass parameters to newly created child applications. XAD thus allows users to leverage code reuse. In one embodiment, a list entity is constructed which includes references to the data in each list entry. The same parameter that defines what to do with a single list entry is applied to each new list entry, allowing arbitrarily large list of entries to be created using a single parameter or set of parameters. Further, parameter passing between parent and child objects may likewise be optimized. For example, a parent object can pass list indices to a child object, said list indices corresponding to list elements that were passed to the child, via new scope parameters.

Parameters that introduce a new scope have the "NewScope" attribute set to true. For example, the line "<sys:Param Name="..."NewScope="true".../>" is typically used to set the new attribute to true. New scope parameters may be used to introduce one or more variables within the scope. The variables are parameters that are declared implicitly. Variables are declared along with the declaration of the new scope parameter, as can be seen in the example provided in Table 10 (Row 1). As discussed above, new scope is introduced for any entity that is to be instantiated multiple times. Table 10 (Row 2) illustrates a definition of such a factory:

TABLE 10

New Scope Parameter

```
1   <sys:TagDefinition Name="fwk:Text" Type="fwk:UIElement">
        <sys:ParamGroupRef Ref="fwk:FrameworkElementParamGroup" />
            <sys:ParamGroupRef Ref="fwk:TextExtensionsParamGroup" />
    </ sys:TagDefinition>
2   <sys:TagDefinition Name="FlowPanel" Type="fwk:UIElement">
        <sys:Choice>
            <sys:ParamGroup>
                <sys:Param Name="Data" Type="sys:Data" ... />
                <sys:Param   Name="RepeatedChild"
                    Type="sys:UIElement"
    NewScope="true" ... >
                    <sys:ScopeVariable Name="DataContext"
                        Type="sys:Data"
    ... />
                </ sys:Param>
            </ sys:ParamGroup>
            <sys:Param       Name="Children"
                Type="fwk:UIElement"
    DefaultParam="true" ... />
        </sys:Choice>
    </sys:TagDefinition>
```

In the above example (Table 10, Row 2), the scope introduced by the RepeatedChild parameter has a scope variable named DataContext. This variable is set to the item corresponding to the sub-view to be instantiated. The above definition would be applied as shown in Table 11 (Row 1), assuming List.xml contains the XML shown in Table 11 (Row 2).

TABLE 11

Example Use of Scope Variable

```
1   <Application.Resources>
        <XmlFileDataSource File="List.xml" Name="ListData" />
    </ Application.Resources>
    ...
    <FlowPanel Data="$ListData" FlowOrientation="Vertical" >
        <Text Param="RepeatedChild" Text="$DataContext /@Name" />
    </ FlowPanel>
2   <Employees>
        <Employee Name="Employee A" />
        <Employee Name="Employee B" />
        <Employee Name="Employee C" />
        <Employee Name="Employee D" />
        <Employee Name="Employee E" />
        <Employee Name="Employee F" />
        <Employee Name="Employee G" />
        <Employee Name="Employee H" />
    </ Employees>
```

In the example shown in Table 11, for each list item, the FlowPanel entity will create a corresponding Text entity. The resulting Flowpanel entity would display a list of the Employees A-H on the monitor. One skilled in the art will appreciate that each line corresponds to an instantiation of a Text entity. What varies from one instantiation to the next is the value of the "DataContext" scope variable. The resulting pattern is referred to as a repeater pattern. It is the basis for iteration over datasets in XAD. In an embodiment, repeater patterns may be nested for multidimensional iteration.

Attached Parameters

Attached parameters are parameters associated by a parent object with a child, that the child may not know how to process. For example, a "triangle" object that is a child of a parent "drawing" object may not specifically know how to deal with "position" coordinates, since position coordinates relate to general location within the drawing and not specifically to shaped such as triangles. Attached parameters allow parent objects to access data and/or functionality associated with a child object. XAD checks attached parameters for correct usage based on the definition of said parameters in the parent object. Table 12 (row 1) illustrates an exemplary tag definition.

TABLE 12

Attached Parameters Example

| | |
|---|---|
| 1 | `<sys:TagDefinition Name="DockPanel" Type="fwk:UIElement">`<br>  `<sys:Param Name="Children" Type="fwk:UIElement" Max="Unbounded">`<br>    `<sys:AttachedParam Name="Dock" Type="sys:Data" TargetType="fwk:Dock" />`<br>  `</sys:Param>`<br>`</sys:TagDefinition>` |
| 2 | `<DockPanel>`<br>  `<Text DockPanel.Dock="Top" Text="Top of the View" />`<br>  `<Text DockPanel.Dock="Bottom" Text="Bottom of the View" />`<br>`</DockPanel>` |

The XAD code definition in Table 12 (row 1) defines an entity called DockPanel, which includes an attached parameter called "Dock" which may be referred to as "DockPanel.Dock". Table 12 (row 2) illustrates exemplary XAD code using the DockPanel entity.

As shown in Table 12, DockPanel.Dock is specified as an attribute to each of the Text entities, even though DockPanel.Dock is not necessarily one of the parameters specified in the tag definitions for the Text entity. Since DockPanel.Dock is an attached parameter, it is used in conjunction with a Text entity, but is actually defined in the declaration of the DockPanel entity shown in Table 12 (row 1).

Resource Parameters

Another type of parameter is the resource parameter. Resource parameters provide a place to store objects that do not have a logical position in the object hierarchy. Resource parameters can be used to anchor sets of arbitrary entities under a given entity. Actions and state associated with resource parameters may be used throughout the application. An exemplary definition of resource parameters is shown in Table 13.

TABLE 13

Example Resource Parameter

```
<Application>
  <!-- Top level state for an application -->
  <Application.Resources>
    <...DataSource Name="ViewState" ... />
    <...DataSource Name="Document" ... />
  </ Application.Resources>
  <!-- Top-level Actions for an application -->
  <Application.Resources>
```

TABLE 13-continued

Example Resource Parameter

```
    <...Action Name="FileOpenCmd" ... />
    <...Action Name="FileSaveCmd" ... />
  </ Application.Resources>
  <!-- UI Elements bound to top-level state and Actions -->
  ...
</ Application>
```

UI elements may be bound to state and/or actions via XAD's data binding capability, discussed above.

Structures

In XAD, a "structure" is a group of entities that may be passed as one name. Structures in XAD may also be nested. An example of structures and nested structures is shown in Table 14.

TABLE 14

Nested Structures

```
<sys:Signature Name="app:ActionsAndDataSignature" Type="sys:Object">
  <sys:OutParam Name="Actions" Signature="app:ActionsSignature" />
  <sys:OutParam Name="Preferences" Signature="app:PreferencesSignature">/
  <sys:OutParam Name="RecentDocuments" Type="sys:Data" />
</ sys:Signature>
<sys:Signature Name="app:ActionsSignature" Type="sys:Object">
  <sys:OutParam Name="Save" Type="sys:EventHandler" />
  <sys:OutParam Name="Print" Type="sys:EventHandler" />
</ sys:Signature>
<sys:Signature Name="app:PreferencesSignature" Type="sys:Object" >
  <sys:OutParam Name="User" Type="sys:Data" />
  <sys:OutParam Name="Enterprise" Type="sys:Data" />
</ sys:Signature>
<sys:TagDefinition Name="app:SomeAppPane" Type="fwk:UIElement" >
  <sys:Param Name="ActionsAndData" Signature="sys:ActionsAndDataSignature" />
  <sys:Body>
  ...
  </ sys:Body>
</sys:TagDefinition>
```

In this example, the $ActionsAndData.Actions.Print and $ActionsAndData.Actions.Save bindings would be valid for all parameters of type sys:EventHandler. Similarly, $ActionsAndData.RecentDocuments, $ActionsAndData.Preferences.User, and $ActionsAndData.Preferences.Enterprise would be valid for all parameters of type sys:Data. $ActionsAndData would be valid for all parameters of Signature app:ActionsAndDataSignature. $ActionsAndData.Actions would be valid for all parameters of Signature app:ActionsSignature. Finally, $ActionsAndData.Preferences would be valid for all parameters of Signature app:PreferencesSignatures.

Manifests

In an embodiment, XAD uses "Manifests" to bring together the parts of an application, such as application description 202 shown in FIG. 2. A manifest is a specification capbable of being processed by a computer that describes aspects of the application, e.g., which files are needed by the application, what dependencies exist between objects, and what user-environment-specific data is part of the application (such as user interface element text in the user's native language, icons, etc., in contrast to data which the application operates upon).

Built-In Tags

Built-in tags are tags that are pre-defined and provide significant capabilities to XAD developers. Conventionally built-in tags are prefixed with "sys:". For instance, these built-in tags may allow conditional operations, repeating operations, and the creation of objects. One such type of built-in tag is referred to as a "dynamic entity" tag, which may be used to change, within a data description, what configuration parameters are used. This allows real-time modification of the configuration of an object on the screen. For example, in response to a user selecting a given user interface element, the function and/or purpose of the element may be altered in real time. For example, one output window may be used to display output from arbitrarily many different application views based on receipt of a "cycle to the next application view" user command. The dynamic entity tag, in an embodiment, provides for dynamic entity instantiation by tag name as shown in the following Table 15:

TABLE 15

Example Dynamic Entity Usage

```
<sys:DynamicEntity tag= "$DateTag">
    Namespace="http://www.Microsoft.com/xaf/xcal ... ">
    ...
</sys:DynamicEntity>
```

In the example shown in Table 15, the built-in entity "Dynamic Entity" provides a developer the ability to dynamically define an entity. In this case, $DateTag resolves to a local name.

Another type of built-in tag called a "switch entity" tag allows applications to be dynamically reconfigured by way of conditional construction of an object or of multiple, related objects. While XAD is a declarative language, it is still expressive enough to allow conditional construction of entities. A single construct is provided to enable conditional construction: Switch. The switch entity tag can be parameterized by "cases" or "conditions" tags. Cases can be thought of as similar to a C# switch, while Conditions are similar to a set of C# if-else clauses. In an embodiment, the use of Cases and Conditions is mutually exclusive, meaning that a Switch cannot mix Cases and Conditions within its body. In addition, in this embodiment, Cases may only be used when a Switch specifies a value for its Data param, otherwise Conditions must be used.

Using Switch allows an author to conditionally return 1 or many entities as the result of evaluating the switch. Table 16 illustrates some sample XAD data (row 1), sample uses of conditional switching (rows 2 and 3).

TABLE 16

Example Resource Parameter

```
1   <sys:InlieData Name="Electronics">
        <Items>
            <Item Description="Toaster" Price="49.99"/>
            <Item Description="VCR" Price="199.99"/>
            <Item Description="DVD Player" Price="279.79"/>
            <Item Description="Receiver" Price="549.99"/>
            <Item Description="Sub-woofer" Price="350"/>
        </Items>
    </sys:InlieData>
2   <sys:Switch>
        <sys:Condition Test="$Electronics/Item[1]/@Price > 50.00">
        ...
        </sys:Condition>
    </sys:Switch>
3   <StackPanel Data="$Electronics">
        <sys:Switch Param="RepeatedChild">
            <Condition Test="./@Price > 500">
                <TextBlock Text="./@Description" FontFamily="Arial"
```

TABLE 16-continued

Example Resource Parameter

```
                FontWeight="Bold" Foreground="Red" />
            </Condition>
            <Condition Test="./@Price < 100">
                <TextBlock      Text="./@Description"
    FontFamily="Georgia"
                    FontWeight="Bold" Foreground="Green" />
            </Condition>
            <sys:Default>
                <TextBlock Param="Default" Text="./@Description"
                    FontFamily="Courier New"/>
            </sys:Default>
        </sys:Switch>
    </StackPanel>
```

As may be appreciated, row 2 of Table 16 shows the syntax, in an embodiment, to create entities based on values greater than 50.00 dollars. Row 3 of Table 16 furthers this example of showing the text block entities for other conditional tests. The resultant view would display all the elements items in row 1, i.e., "Toaster," "VCR," "DVD Player," "Receiver," and "Sub-woofer." However, "Toaster" would be in Georgia bold font and in green, where "Receiver" would be in Arial bold font and in red.

Switch together with dependency tracking and revalidation enables automatic implementation of dynamic reconfiguration. Dynamic reconfiguration is discussed in more detail below, in conjunction with FIG. 5.

Framework Tags

XAD and XAF allow for another type of tag referred to as the framework tag (abbreviated "fwk," as can be seen in FIG. 1). A framework tag may be used to create an object that is part of an application. Framework tags may be used to reference actions, data sources, transformations, and association managers (each discussed below). In an embodiment, application debugging may also be performed via framework tags.

At the most simplistic level, UI connectors provide the ability to visualize XAF data and to respond to events that modify that data. Any one particular UI connector actually owns an "element tree," or set of visual elements that may be displayed, that the UI connector is presenting. Associated with each UI connector is code to translate data into visual elements and code to translate events into editing operations.

In an embodiment, the UI connectors simply expose properties and events of a client platform, such as the Windows® Presentation Foundation (WPF) elements. Moreover, a UI connector provides a specific form of data-binding, binding data from the XAF Data Layer to the WPF element. Different elements are designed to visualize different types of data. For example, an Image element visualizes bitmapped display data, a Text element visualizes string data, and a ListBox visualizes an ordered list of possibly heterogeneous data. Some elements, like ListBox and TextBox, also can visualize a 'selection' on that data. The concept of a selection is basically another data input.

In general, specific UI connectors are designed to work with a specific type of data to be visualized. If two elements use exactly the same mechanism to accept the input (or parameters) for what they visualize then a developer can write a single UI connector to handle both of them. The parameters are used to give the UI connector a factory object which is used to create children as required. The UI connector typically provides a data context to the factory. The factory is normally a fragment of XAD which is wrapped in an object by the XAD engine.

Table 17 illustrates a set of UI connectors that may be provided.

TABLE 17

Sample Built-in UI connectors

| UI Connector | Base Element Class | Windows Client Platform Elements Supported |
|---|---|---|
| SimpleUIConnector | UIElement | Sub-classes of Shape |
| PanelUIConnector | Panel | DockPanel, FlowPanel, Canvas, GridPanel |
| DecoratorUIConnector | Decorator | Border/Box |
| TextUIConnector | Text | Text |
| WindowUIConnector | Window | Window |
| ContentControlUIConnector | ContentControl | Button, CheckBox, RadioButton, ListItem, ComboBoxItem |
| SelectorUIConnector | Selector | ListBox, ComboBox, RadioButtonList |
| HeaderedItemsControlUIConnector | HeaderedItemsControl | MenuItem |
| ItemsControlUIConnector | ItemsControl | Menu, ContextMenu |
| TabularPanelUIConnector | Panel | |
| HeaderedContentControlUIConnector | HeaderedContentControl | |

One type of framework tag, the association manager, may be used to associate an object with a data structure or element of a data structure. For example, a list association manager may be used to associate an object with an item in a list. The resulting list item will be dynamic, in that it will contain a reference the object and its associated data versus a static value.

In Operation

Figure 4:
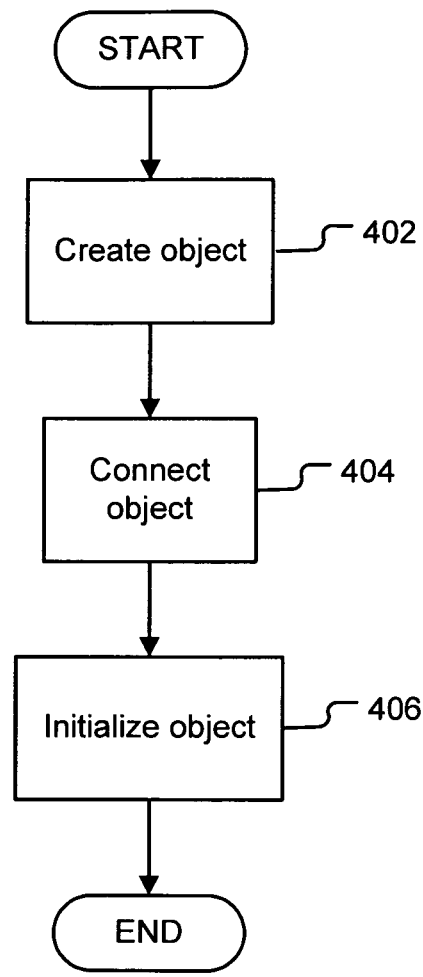
FIG. 4 is a flow diagram illustrating operational characteristics of one embodiment of the present invention in which a markup language is executed.

FIG. 4 illustrates the operational flow of the operations performed by a builder in accordance with one embodiment of the present invention in which an object is created and set up for use. The instantiation process 400 is performed using an operation flow beginning with a create operation 402 and concluding with a initialize operation 406. In general, the flow 400 may be performed by a single configuration service, or by a plurality of services.

Create operation 402 creates an object. In one embodiment, create operation 402 creates data structures necessary for the object. In another embodiment, create operation 402 also allocates memory as needed for the data structures.

Once create operation 402 has created an object, connect operation 404 connects the object to other objects according to the relationship of that object to others. In one embodiment, a graph of connections between the created object and one or more preexisting objects is built. The create-connect-initialize sequence enables the XAD engine to support cyclic connections among a group of objects. In the case of data and transforms, such cycles are prohibited, and the XAD compiler performs some checking to prevent such cycles.

A wiring or connecting graph produced by connect operation 404 defines interconnections and interrelationships between objects. In an embodiment, these connections will remain until altered by dynamic reconfiguration (discussed below), or until the object is erased. Which connections are necessary is determined by the engine as it executes the application markup code. In an embodiment, connect operation 404 connects data provider objects to the application.

Initialize operation 406 initializes the created objects. In an embodiment, initialization involves setting one or more non-deterministic values to zero, or other predefined value. In another embodiment, initialize operation 406 calls constructors associated with objects. In yet another embodiment, initialize operation 406 instructs created objects to initialize themselves. One skilled in the art will appreciate that initialize operation 406 may also perform other operations typically associated with object initialization without departing from the scope of the invention. In an embodiment, initialize operation 406 occurs conditionally based on whether a given object contains data to be initialized. In an embodiment, objects may be initialized with different values based on conditionals. For example, the following definition shown in Table 16 would cause XAD to display items in a list in red if they are priced above $500, and display items in green if priced below $100.

TABLE 16

Sample XAD code

```
<XmlFileDataSource Name="Items" File="Items.xml" />
<FlowPanel Data=$Items">
  <sys:Switch Param="RepeatedChild">
    <sys:Condition Test=./@Price > 500>
      <Text Text=./@Description Foreground="Red" />
    </ sys:Condition >
    < sys:Condition Test=./@Price < 100>
      <Text Text=./@Description Foreground="Green" />
    </ sys:Condition >
    <Text Param="DefaultEntity" Text=./@Description />
  </sys:SelectedEntity>
</FlowPanel>
```

In one embodiment, the engine performs the operations 402, 404, and 406 using just-in-time compilation. In another embodiment, the application is precompiled. In yet another embodiment, a combination of pre-compilation and just-in-time compilation is used to achieve a balance of performance and flexibility.

Figure 5:
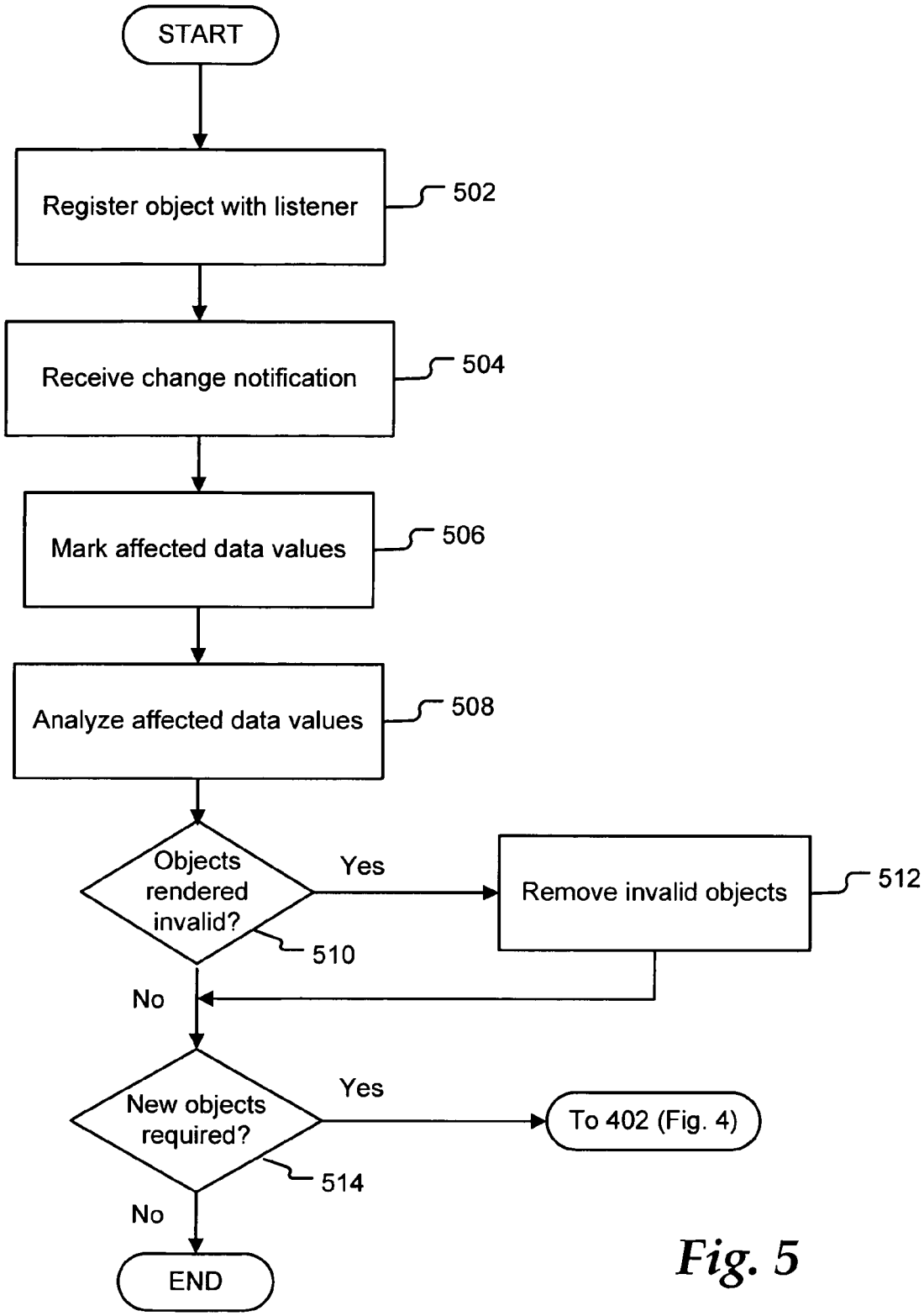
FIG. 5 is a flow diagram illustrating operational characteristics of one embodiment of the present invention in which an application is dynamically reconfigured.

XAD allows applications to be dynamically reconfigured. Dynamic reconfiguration may be triggered by a change in data flowing into an application, or modification of data existing with an application. FIG. 5 illustrates how an application may be dynamically reconfigured in one embodiment of XAD.

A listener is a computer agent which monitors an application or group of applications for certain events. The XAD listener monitors certain registered objects' data within a XAD application for a change in value. Registration operation 502 registers objects and their data with such a listener.

When a change in a data value occurs within a registered object, a change notification is received from the listener by receive operation 504. Mark operation 506 then identifies one or more data values that depend on the changed value, and marks them as affected by the change. Analyze operation 508 analyzes the effects of the changed value on each of the marked data values. Based on the results of this analysis, determine operation 510 determines whether any objects were rendered invalid by the changed value.

If one or more objects were rendered invalid by the change, flow branches YES to remove operation 512 which removes the one or more now-invalid objects. Flow then branches to determine operation 514. If determine operation 510 determined that no objects were rendered invalid by the change, flow branches, flow branches NO to determine operation 514.

Determine operation 514 determines whether any new objects are required as a result of the changed value. If one or more new objects are required, flow branches YES to creation operation 402 (FIG. 4), and object creation, connection and initialization proceeds as discussed above in conjunction with FIG. 4. If no new objects are determined to be required by determine operation 514, flow branches NO to the end of the exemplary flow.

To simplify creation of new objects and deletion of invalid objects, XAD is capable of lifetime management of objects. A lifetime domain is a unit of reconfiguration in a XAD application. Objects whose life spans are tied to each other (for example, a first object may have no purpose without the existence of a second object, and the second object may have no purpose without the existence of the first object) are placed into the same lifetime domain. There can be many objects in a given lifetime domain. When the objects are no longer needed, all objects in a lifetime domain can be easily deleted by referencing the lifetime domain for deletion (versus potentially referencing thousands upon thousands of individual objects in a lifetime domain for deletion). One skilled in the art will appreciate that objects within a given lifetime domain need not be functionally related; rather, they need only share a creation time and a codependence such that they can be destroyed at the same time.

Figure 6:
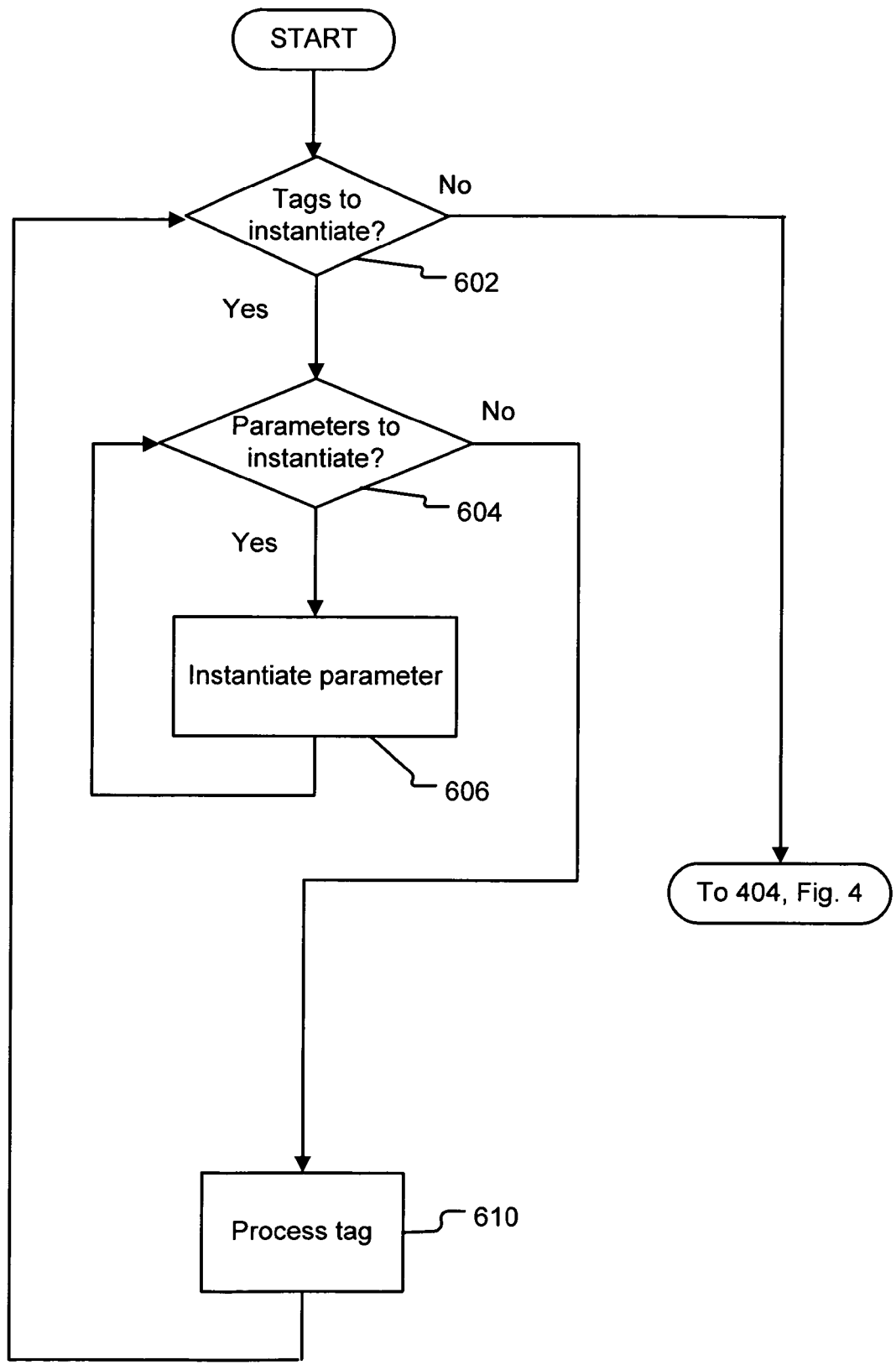
FIG. 6 illustrates the operational flow of the operations performed by the creation operation in an embodiment of the present invention.

In an embodiment, XAD can leverage conditionally-created objects in conjunction with dynamic reconfiguration of applications. Objects of varying types can be therefore be created, depending on the nature of the data value change. FIG. 6 illustrates the operational flow of the operations performed by creation operation 402 (FIG. 4) in accordance with one embodiment of the present invention. First, determine operation 602 determines whether there are any tags to instantiate. If there are tags to instantiate, flow branches YES to determine operation 604. If there are no tags to instantiate, or all tags have already been instantiated, flow branches NO to connect operation 404 (FIG. 4).

Determine operation 604 determines if a tag contains any parameters that must be instantiated. If no parameter tags are present, flow branches NO to operation 608. If parameter tags are present, flow branches YES to instantiate operation 606.

Instantiate operation 606 instantiates the parameters found by determine operation 604. As discussed above, parameters are used to describe how to create, connect, or configure a factory or object. As described earlier, parameters may include one or more properties of a factory or object, a reference to a piece of data, or a reference to another factory or object. Properties may be either static or dynamic.

Process operation 610 processes a tag according to its data type. Several different kinds of tags exist, and thus several possible approaches are implemented by process operation 610. A primitive tag (a tag that actually correspond to an object) is processed by creating a new object. In an embodiment, all objects created correspond to entities.

Some tags define scope boundaries. Such tags cause process operation 610 to create a "factory," which may be invoked at a later time for on-demand instantiation of entities. When a factory is processed, a new scope domain is created. Factories can be checked by entities for dependency information, which can be useful during dynamic reconfiguration.

Process operation 610 processes a switch tag by creating a switch factory. This is a factory that supports branching of application control based on various user-specified conditions. The factory may be used to monitor various conditions which, when met, will trigger a branch in application flow. In an embodiment, just-in-time compilation is used to modify objects when necessitated by a tag being reprocessed as part of dynamic reconfiguration.

Process operation 610 may also process other types of tags. For example, a binding tag triggers process operation 610 to create a factory to indicate that a certain parameter value is actually a reference to some other entity. This is roughly analogous to a pointer in a procedural language. A dynamic entity tag allows late binding of an entity to be created. In one embodiment, the late binding is deferred until application runtime.

After process operation 610 has processed a tag, flow returns to determine operation 602.

In an embodiment, add-ins may be added to an XAD application. Add-ins are self-contained software packages which can extend the basic feature set of a given application without requiring the application to be upgraded. Add-ins allow new features or third-party extensions to be added incrementally as they become available, without requiring users to go through a potentially expensive upgrade cycle.

XAD add-ins are packaged in assemblies. In an embodiment, assemblies are loaded through static dependencies specified in the manifest (discussed above). In one embodiment, XAD applications communicate with add-ins via an extensibility protocol. An extensibility protocol may be defined in a separate assembly so that the protocol can be published and references by both the application and third-parties developing the extension.

An extensibility protocol has two parts. The first part is the metadata schema. Metadata is data that describes data. In the context of XAD, metadata can be used to describe the features implemented by an add-in. The metadata may include tag names, parameters to be passed, human-readable text for the UI, etc. The extensible application defines the metadata schema (what to expect from the add-in), while the add-in provides the content. The second part of an extensibility protocol is the tag signature (discussed above). An add-in implements its features by defining tags. An application uses these tags to access the add-in features. The application defines the tag signatures (what type of entities the tags should result in, what parameters the tags should take, etc.), while the add-in provides the tag definitions (the tag name and the actual implementation). Tag signatures are therefore roughly analogous to interfaces, while tag definitions are roughly analogous to interface implementations.

In an embodiment, XAD supports a global metadata tree accessible via a Metadata tag. A metadata tree is a union of all metadata constituent files from all dynamically loaded assemblies. At runtime, the metadata tree is automatically updated whenever an assembly with metadata constituent files is loaded or unloaded. Proper change notifications are sent so the application can update itself dynamically (as discussed previously in conjunction with FIG. 5). The metadata tree allows an application to discover what add-ins are loaded, and to make use of the features the add-ins provide.

In an embodiment, an add-in defines tags for accessing the features the add-in implements. Since the add-ins may not be available at the time an application is written, it may not be possible for the application author to know and use the tags defined by an add-in. The author may only know, and thus may only statically define, the tag signatures. The actual tag names and eventual parameter values can be provided by the add-in using metadata. Since the metadata scheme is part of the application-defined extensibility protocol, metadata scheme information is accessible to the application. The application can therefore read the metadata, and dynamically instantiate an entity by tag name. XAD supports a DynamicEntity tag for this purpose.

Computer System

Figure 7:
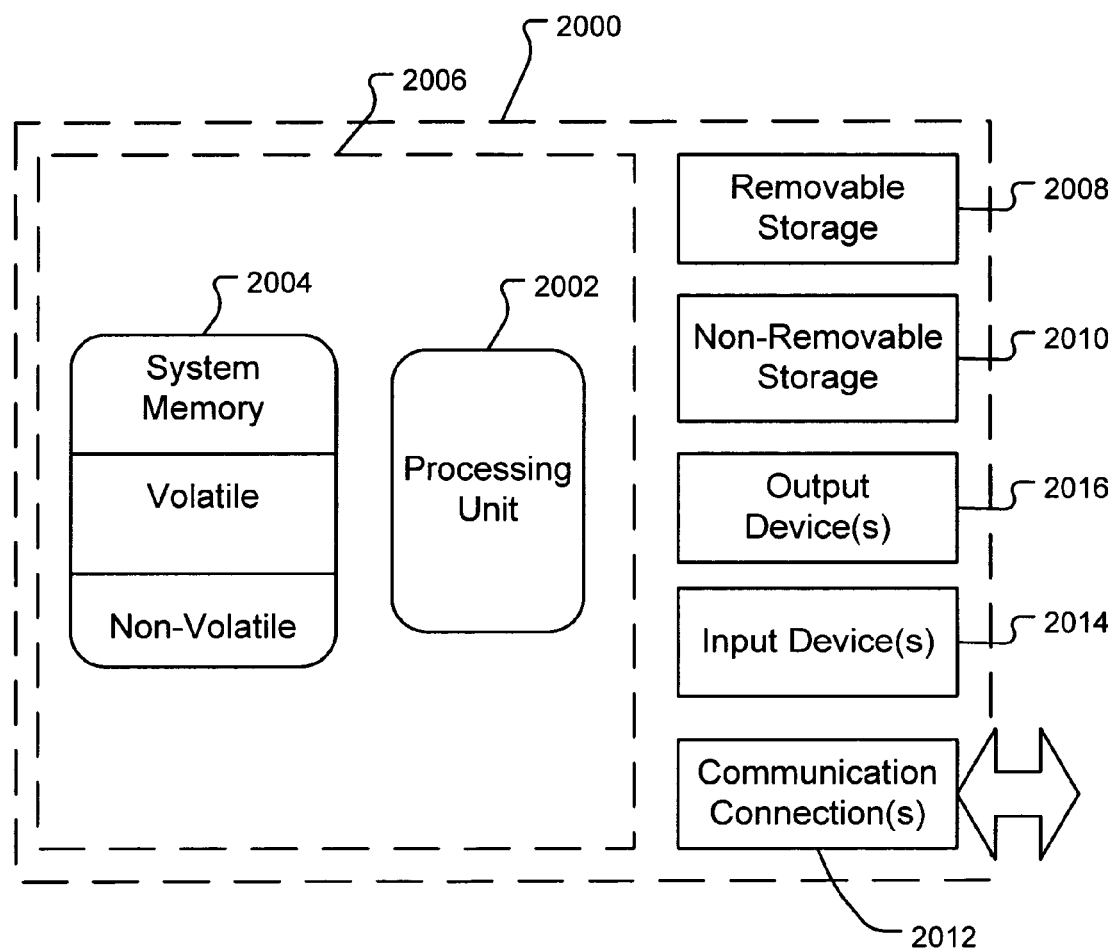
FIG. 7 illustrates an example of a suitable computing system environment on which an embodiment of the present invention may be implemented.

Given that the present invention may be implemented as a computer system, FIG. 7 is provided to illustrate an example of a suitable computing system environment on which embodiments of the invention may be implemented. In its most basic configuration, system 2000 includes at least one processing unit 2002 and memory 2004. Depending on the exact configuration and type of computing device, memory 2004 may be volatile (such as RAM), non-volatile (such as ROM, flash memory, etc.) or some combination of the two. This most basic configuration is illustrated in FIG. 20 by dashed line 2006.

In addition to the memory 2004, the system may include at least one other form of computer-readable media. Computer-readable media can be any available media that can be accessed by the system 2000. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 2004, removable storage 2008, and non-removable storage 2010 are all examples of computer storage media.

Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 2000. Any such computer storage media may be part of system 2000.

System 2000 may also contain a communications connection(s) 2012 that allow the system to communicate with other devices. The communications connection(s) 2012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 2000 includes peripheral devices, such as input device(s) 2014 and/or output device(s) 2016. Exemplary input devices 2014 include, without limitation, keyboards, computer mice, pens, or styluses, voice input devices, tactile input devices and the like. Exemplary output device(s) 2016 include, without limitation, devices such as displays, speakers, and printers. For the purposes of this invention, the display is a primary output device. Each of these devices is well know in the art and, therefore, not described in detail herein.

With the computing environment in mind, the previous figures were described with reference to logical operations being performed to implement processes embodying various embodiments of the present invention. As will be appreciated by those skilled in the art, these logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

As discussed above, XAD offers progressive levels of abstraction to assist in design, strong typing, a high degree of static checking, and a high degree of extensibility. XAD also allows manipulation of heterogeneous data.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for computationally configuring an application, the method comprising:
   receiving a description identifying at least one entity tag corresponding to at least two entities, at least one framework tag corresponding to at least one user interface, and at least one specification of relationship between the at least two entities;
   creating a plurality of objects corresponding to the at least one entity tag;
   connecting the plurality of objects to each other according to the relationship;
   creating at least one user interface object associated with the at least one framework tag;
   connecting the at least one user interface object to the plurality of objects corresponding to the at least one entity tag;
   detecting, during application runtime, a change in a state of data associated with at least one of the at least two entities identified by the at least one entity tag; and
   reconfiguring a connection associated with the at least one user interface object and the plurality of objects corresponding to the change in the state of the data associated with the at least one entity tag.

2. A method as defined in claim 1 further comprising:
   initializing the plurality objects for use.

3. A method as defined in claim 1, wherein said connecting comprises processing at least one tag parameter corresponding to the at least one entity tag.

4. A method as defined in claim 1, further comprising type checking the at least one tag parameter.

5. A method as defined in claim 1, wherein connecting the at least one user interface object further comprises creating a graph of connections between the at least one user interface object and the plurality of objects.

6. A method as defined in claim 1, wherein connecting the at least one user interface object further comprises checking for circular dependencies and eliminating circular dependencies.

7. A method as defined in claim 1, wherein said connecting comprises processing the at least one entity tag for creating at least one factory to provide on-demand instantiation of an entity.

8. A method as defined in claim 1, wherein said connecting comprises processing the at least one entity tag for creating at least one factory to handle branching.

9. A method as defined in claim 1, wherein visibility of a new data value is scheduled to enable out-of-order execution of instructions.

10. A method as defined in claim 1, wherein the at least one entity tag specifies a factory for creating a plurality of objects.

11. A method for computationally configuring an application, the method comprising:
  providing a configuration service of an application having at least an entity tag corresponding to at least an entity;
  creating at least one object corresponding to the entity;
  connecting the at least one object to the configuration service;
  initializing the at least one object for use;
  receiving a framework tag corresponding to a user interface object;
  creating a user interface object associated with the framework tag;
  connecting the user interface object to the configuration service;
  receiving a notification of a change in a state of data associated with the entity;
  reconfiguring, during application runtime, the user interface object connected to the configuration service in response to the change in the state of data associated with the entity.

12. A method as defined in claim 11 further comprising:
receiving parameters values; and
finding data based on parameter values to the initialized object.

13. A method as defined in claim 11 further comprising:
receiving an event notification; and
reconfiguring the object in response to the event notification.

* * * * *